United States Patent
Stehning et al.

[11] Patent Number: 6,155,636
[45] Date of Patent: Dec. 5, 2000

[54] SLIDING INTERIOR SUNROOF PANEL ASSEMBLY FOR AN AUTOMOBILE SUNROOF

[75] Inventors: Kai Stehning, Bad Soden; Frank Niebuhr, Gifhorn, both of Germany

[73] Assignee: Meritor Automotive GmbH, Germany

[21] Appl. No.: 09/264,257

[22] Filed: Mar. 8, 1999

[30] Foreign Application Priority Data

Mar. 11, 1998 [DE] Germany .................. 198 10 505

[51] Int. Cl.⁷ .................................................. B60J 7/00
[52] U.S. Cl. ............................................. 296/214; 296/208
[58] Field of Search ................................ 296/208, 214; 49/38; 52/473

[56] References Cited

U.S. PATENT DOCUMENTS

| | | | |
|---|---|---|---|
| 4,717,200 | 1/1988 | Kruger | 296/214 |
| 5,609,387 | 3/1997 | Stallfort et al. | 296/214 |

FOREIGN PATENT DOCUMENTS

| | | | |
|---|---|---|---|
| 3438360 | 5/1985 | Germany | 296/208 |

*Primary Examiner*—Dennis H. Pedder
*Attorney, Agent, or Firm*—Carlson, Gaskey & Olds

[57] ABSTRACT

A sliding interior sunroof panel assembly for covering the lower side of a sliding panel of a sliding sunroof construction and for the ventilation of the vehicle interior with a partially, opened or raised sliding panel consists of a rigid interior roof panel (1) and a ventilation strip (4) attached near the front of the panel. The ventilation strip (4) is set into an opening in the interior roof panel (1) with longitudinal play and latched there in a particular manner so that differing coefficients of thermal expansion of the different materials used for the interior roof panel (1) and the ventilation strip (4) cannot lead to undesirable undulation of the ventilation strip (4) with corresponding temperature conditions since stress is regulated at the latch positions by displacement movements between the latch elements (16, 19). The ventilation strip (4) always, therefore, lies flat against the covered (12, 13), lower visible surface of the sliding interior sunroof panel. Mounting of the ventilation strip on the interior roof panel (1) is such that at first the ventilation strip is attached with location spaces (14) to the rear edge (15) of the interior roof panel (1) and then pivoted upwards in its front area until the latching projections (16), resilient above the latched surfaces (19) but lying in contact with these, snap into place.

18 Claims, 2 Drawing Sheets

SLIDING INTERIOR SUNROOF PANEL ASSEMBLY FOR AN AUTOMOBILE SUNROOF

FIELD OF THE INVENTION

This invention generally relates to a sliding interior sunroof panel assembly for a automobile sunroof. More particularly, this invention relates to a sunroof panel that is rigidly formed and has an opening in the area of its front edge into which a ventilation strip with gripping recess can be set and fixed by latches.

BACKGROUND OF THE INVENTION

In a known sliding interior sunroof panel assembly, which is shown in German Patent No 35 27 839 C1, the ventilation strip has a groove at its front and rear edges that form latch connections in conjunction with the corresponding edges of the opening. Here the edges of the opening engage in a latching manner along their entire length with the two grooves. However, it has become clear that the latching engagement is difficult to achieve during assembly, particularly since latching has to be produced along the entire length of the opening and the ventilation strip. Moreover, undesirable undulating or wave-like deformations appeared on the ventilation strip, these being explained in further detail below.

In a known example of such a panel assembly, the rear end only of the ventilation strip was pressed onto the corresponding edge of the opening, while the front end of the ventilation strip was connected to the interior roof panel by means of a series of thermo-rivets, spaced relative to one another and formed from the material of the ventilation strip. While this made mounting the ventilation strip onto the interior roof panel easier, undesirable undulating deformations still occurred on the ventilation strip, caused by the differing coefficients of thermal expansion of the different plastic materials used for the ventilation strip on the one hand and the interior roof panel on the other.

For various reasons, the use of plastics with coinciding coefficients of thermal expansion is not possible, in particular because the interior roof panel may be relatively thick-walled and reinforced with fiberglass and intermediate metal ply. It is not important to create a homogenous appearance of the surfaces because the lower visible surface of the interior roof panel is, in any case, to be covered with the interior lining material. In contrast, the non-reinforced plastic used for the injection molding of the ventilation strip has a relatively thin-walled structure. The upper surfaces of the ventilation strips, a considerable area of which is visible and is not covered, must be given a homogenous appearance.

SUMMARY OF THE INVENTION

Accordingly, an object of the invention is to provide a sliding interior sunroof panel assembly having a panel and ventilation strip which ensures the latching of the interior roof panel and ventilation strip in such a way to ensure easy assembly while ensuring that undulating deformations of the ventilation strip do not occur.

In the sliding interior sunroof panel according to an embodiment of this invention, the latching connections are not at the level of the roof panel but in the area of the slightly resiliently deformable front wall elements of the ventilation ducts above the level of the roof panel. Moreover, this means that there is no latching along a length of the edge of the opening in the interior roof panel but instead via the short lengths of the latched projections on the front wall elements. The resilient nature of the front wall elements in the area where the latching projections are attached not only allows easy assembly but also play-free support of the latching projections on the corresponding latching surfaces, which are also situated above the level of the roof plate on the interior roof panel. Nevertheless, the pressure and friction forces between the latching projections and the latching surfaces are small enough to allow length-adjusting relative displacements between the latch elements and latch surfaces (i.e., between the ventilation strip and the interior roof panel) as a result of differing coefficients of thermal expansion of the materials used, even where the interior roof panel is to be partly or wholly manufactured from a metallic material. An important precondition for the limited relative displacement required between the ventilation strip and the interior roof panel is the longitudinal play to be provided according to the invention between the ventilation strip and the opening in the interior roof panel.

The ventilation strip can be produced particularly economically if it is formed as a single part with the latching projections. This arrangement ensures that the latching projections are automatically correctly aligned to the level of the interior roof panel during production.

The latching surfaces of the interior roof panel which are assigned to the latching projections of the ventilation strip can also be formed when the interior roof panel is modelled, whereby the rib formed here increases the transverse rigidity of the interior roof panel and at the same time opens up the possibility of determining the height position of the latching surfaces above the level of the interior roof panel by molding plates of different thicknesses, which are inserted into the production form. This latter method allows the pressure and friction forces between latching projections and latching surfaces to be altered without any changes being required in the ventilation strip or its molding die.

If on the one hand the location space between the rear wall elements or the ventilation ducts and the flange edge and on the other hand the rear edge of the opening in the interior roof panel are formed to complement one another the ventilation strip can also be attached to the side of the opening opposite the latch connections in a practically play-free manner as a result of the form-fit of the mutually engaging elements. As a result, the ventilation strip is attached reliably and in a play-free manner to the interior roof panel and can still make any (small) adjustment displacements required along its length as a result of the differing coefficients of thermal expansion of the materials used. Whatever the temperature, there is no visible, deformation of the ventilation strip, the circumferential flange edge of which always remains flat against the interior roof panel.

BRIEF DESCRIPTION OF THE DRAWINGS

Further details of the invention are explained in more detail below on the basis of the embodiment illustrated in the drawings.

DETAILED DESCRIPTION OF THE PREFERRED EMBODIMENT

Figure 1:
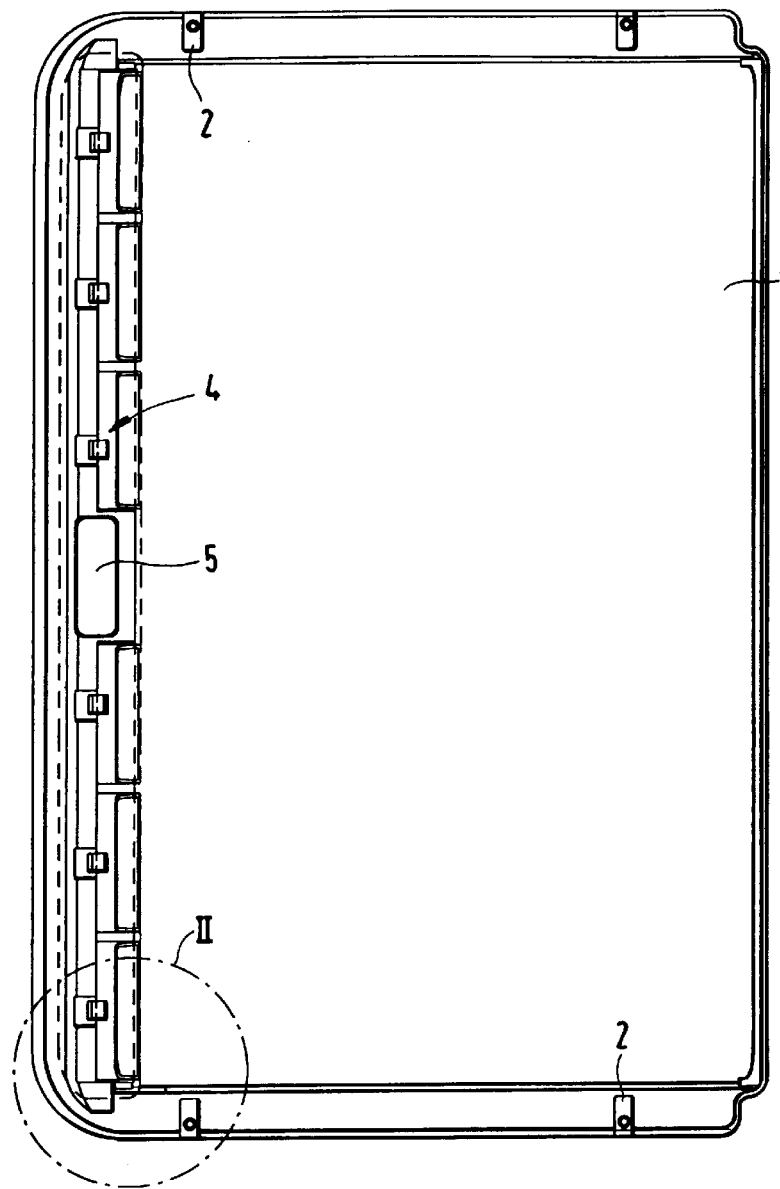
FIG. 1 is a top view of the sliding interior sunroof panel.
Figure 2:
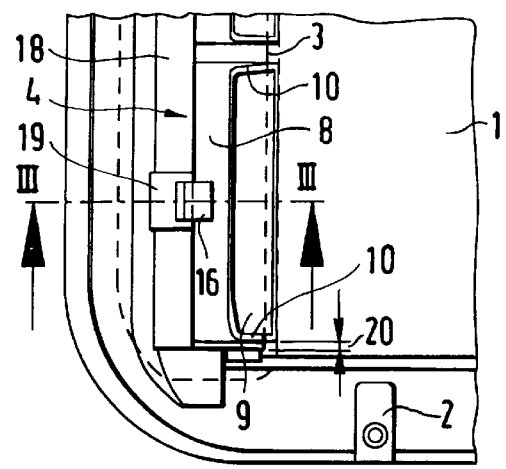
FIG. 2 is a magnified section of top view according to circle II in FIG. 1.
Figure 4:
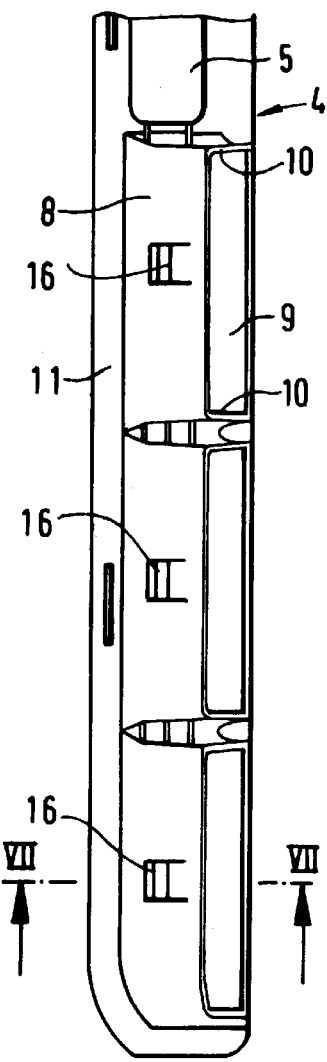
FIG. 4 is an incomplete top view of the ventilation strip.
Figure 5:
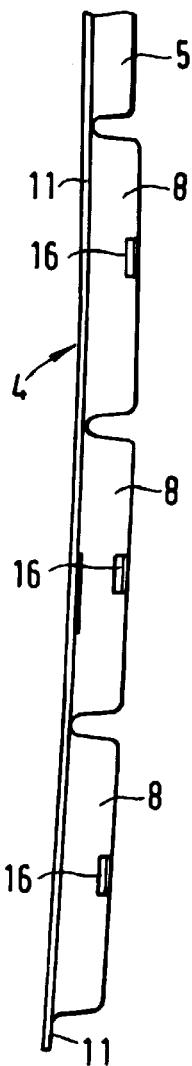
FIG. 5 is an incomplete side view of the ventilation strip.
Figure 6:
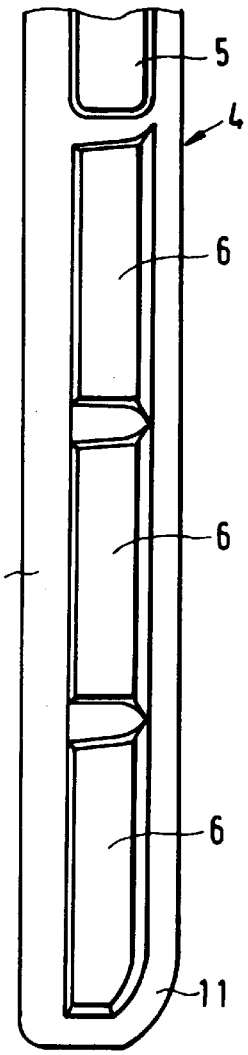
FIG. 6 is an incomplete bottom view of the ventilation strip.

The top view representations in FIGS. 1, 2 and 4 show views of the sliding interior sunroof panel or ventilation strip from above, while the bottom view according to FIG. 6 shows the ventilation strip from its visible side facing the interior of the vehicle after the sliding interior sunroof panel has been installed.

The sliding interior sunroof panel, which is used in all known sunroof configurations, including the so-called slide-and-lift roofs, covers the inside of the sliding panel assigned to the roof opening when the roof is closed. Sliding interior sunroof panels are used both with sunroof panels made of metal and those made of glass. Their task is to dull the incidence of light when the panel is open, and with roofs with glass sliding panels when the panel is closed too, and to regulate ventilation. Since the sliding interior sunroof panel is located in the visible area of the vehicle interior, its surface nature, at the least its color, is to be matched to the rest of the interior of the vehicle. The sunroof panel preferably includes a plate or frame-type, rigidly formed, interior roof panel 1. Both side edges of the panel 1 preferably include guide elements 2 for the displaceable positioning of the sunroof on corresponding guide rails. The known constructional surroundings of the sliding interior sunroof panel are not shown in the drawings and are not described in further detail here, since the invention does not concern these.

In the area of the front edge of the interior roof panel 1 the embodiment preferably has two openings 3, which extend along the front edge, in which a coordinated ventilation strip fitted with a central gripping recess 5 is set and fixed using latch connections as will be described. The ventilation strip 4 has several (in the drawn embodiment, six) slot-shipped ventilation openings 6, aligned parallel to the front edge of the interior roof panel 1 and in rows (FIG. 6). The ventilation openings 6 begin at the lower side of the ventilation strip 4, which is approximately flush with the lower side of the interior roof panel 1, as can best be seen in FIG. 3.

Ventilation ducts 7 preferably are open to the top and directed backwards (i.e., toward the rear of the vehicle) are attached to the ventilation openings, the ducts being delimited by the wall elements of the ventilation strip 4. Each ventilation duct 7 preferably is delimited by four wall elements, namely a front wall element 8, a rear wall element 9 and two side wall elements 10. The ventilation openings 6 with the attached ventilation ducts 7 ensure, as a result of their constructional formation and positioning, that where there is low under pressure above the sliding interior sunroof panel while driving, an outgoing air current is produced from the interior of the vehicle through the ventilation openings 6 and the ventilation ducts 7, which effectively ventilate the vehicle interior.

The ventilation strip has a circumferential flange edge 11 which rests against the recessed circumferential edge of the openings (as seen from below in FIG. 3). The flange edge 11 preferably does not lie directly against the interior roof panel 1 but against a lining layer which covers the lower side of the sliding interior sunroof panel and its side edges. The lining layer consists, for example, of a soft foam layer 12 and a textile layer 13 which forms the visibile surface and is matched in its structure and/or color to the interior of the vehicle. At the contact area of the flange edge 11, the soft foam layer 12 is compressed to a lower layer thickness, as is also shown in FIG. 3.

Figure 7:
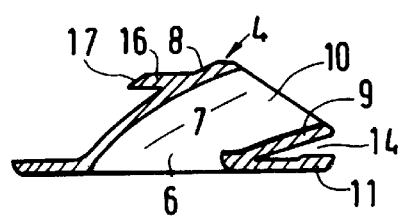
FIG. 7 is an incomplete section through the ventilation strip along line VII—VII of FIG. 4, magnified in comparison to FIG. 4.

The rear wall elements 9 of the ventilation ducts 7 form a location space 14, open to the side, for attaching the ventilation strip 4 to the rear edge 15 of the openings 3. The location space 14 between the rear wall element 9 and the flange edge 11 preferably has an acute-angled cross-section, extending outwards, as can be seen in FIGS. 3 and 7. The rear edge 15 of each opening 3 has, at least in the engagement area with the location space 14, a corresponding acute-angled cross-section. As a result of this configuration, the ventilation strip 4, when it is attached to the rear edge 15, is fixed in a wedge-type, free play manner, compressing the soft foam layer 12 on the interior roof panel 1.

Latching projections 16 are provided on the front wall elements 8 of the ventilation ducts 7, in the upper area of the wall elements 8 and preferably approximately in the center of their length. It is clear that the latching projections 16, as a result of their positioning, are situated in a relatively elastically resilient area of the ventilation strip 4. In the drawn example there are three latching projections 16 on each side of the gripping recess 5, these being attached approximately equidistantly on each side of the gripping recess 5. The latching projections 16 preferably are injection molded in a single part with all parts of the ventilation strip 4 from a suitable thermoplastic material, for example ABS, and are located close to the upper end of the front wall elements 8 of the ventilation ducts 7, approximately parallel to the level of the interior roof panel 1. At the front of each of the latching projections 16 is an angled surface 17, which makes latching easier.

Figure 3:
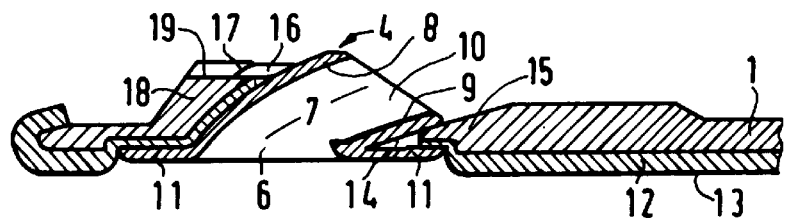
FIG. 3 is an incomplete sectional view along line III—III of FIG. 2, magnified comparison to FIG. 2.

The interior roof panel 1 has a rib 18 which protrudes upwards, parallel to the adjacent opening edge, between its front edge and the openings 3, as can best be seen in FIG. 3. Latching surfaces 19 cooperate with the latching projections 16 and are aligned parallel to the latching projections. The latching surfaces 19 are attached during the molding of the interior roof panel 1 from a suitable plastic, for example rigid PU foam.

The ventilation strip 4 is set into the openings 3 with longitudinal play so that the latching projections 16 can displace against the latching surfaces 19 to regulate stress according to the coefficients of thermal expansion of the materials used and the predominant temperature conditions. The longitudinal play is indicated in FIG. 2 with the gap dimension designated with reference number 20. Corresponding gap dimensions are, of course, found on both sides of the gripping recess 5 and at the other end of the ventilation strip 4.

In the preferred embodiment described and indicated in the drawings, the opening 3, of which there is at least one, is situated in the area of the front edge of the sliding interior sunroof panel. However, it can also be applied in another suitable area of the sliding interior sunroof panel, for example in the area of the rear edge. The same applies to the rib 18 and its latching surfaces 19. The gripping recess does not necessarily have to be part of the ventilation strip 4 as in the preferred embodiment. If the sliding interior sunroof panel is driven by an electric motor, there may be no need for the attachment of a gripping recess.

The sliding interior sunroof panel for covering the lower side of the sliding panel or a sunroof construction and for ventilating the vehicle interior with a partially opened or raised sliding panel, described here and shown in the drawings, consists of a rigid interior roof panel 1 and a ventilation strip 4 attached near a front portion of the panel. The ventilation strip 4 is set into an opening in the interior roof panel 1 with longitudinal play and latched into this in a particular manner so that different coefficients of thermal expansion of the different materials used for the interior roof panel 1 and the ventilation strip 4 cannot lead to undesirable undulation of the ventilation strip 4 under corresponding temperature conditions since stress is regulated at the latching points through displacement movements between the latching elements 16, 19. The ventilation strip 4 always, therefore, lies flat against the covered 12, 13 lower visible surface of the sliding interior sunroof panel. Mounting of the ventilation strip onto the interior roof panel 1 preferably involves first attaching the ventilation strip to an edge 15 of the interior roof panel 1 with location spaces 14 and then pivoting the strip upwards in its front area until the resilient latching projections 16 snap into place with the latching surfaces 19.

The foregoing disclosure and description of the invention are illustrative and explanatory. Various changes in the size, shape and materials as well as the details of the illustrated construction may be made without departing from the spirit of the invention. For instance, it may be desired to provide the latching projections on the rear wall element of the conduit and the location spaces on the front wall element. The scope of legal protection given to this invention can only be determined by studying the following claims.

What is claimed is:

1. A sliding interior sunroof panel assembly for an automobile sunroof comprising
   a panel and a ventilation strip mounted to said panel;
   said panel defined by first, second and side edges and formed of a rigid material;
   said first edge having a forward region surrounding an opening aligned generally parallel to said first edge;
   said ventilation strip latched into said opening and provided with a plurality of ventilation ducts spaced along an alignment parallel to said first edge; said ventilation ducts each having a front wall element, a rear wall element and opposed side elements such that each said duct extends from a ventilation opening in one side of said panel to a ventilation opening on an opposite side of said panel;
   a flange edge formed around front, rear and side edges of said strip so as to abut against corresponding edge areas around said opening;
   said duct rear wall element extending over at least a part of a corresponding edge of said opening as abutted on by a rear part of said flange edge, so as to hold said strip rear edge against said panel in a location space defined between said rear wall element and said flange edge;
   each said duct comprising at least one latching projection extending from said front wall element when latched over at least a part of said corresponding edge areas of the opening as abutted on by a forward part of said flange edge, said latching projections engaging with a corresponding part of said panel, said latching projections being spaced rearwardly away from said strip front flange edge.

2. A sliding interior sunroof panel assembly according to claim 1, wherein said latching projections are injection molded in a single part with a remainder of said ventilation strip and are situated close to an upper end of said front w,all elements of said ventilation ducts, said projections lying in a plane approximately parallel to said panel.

3. A sliding interior sunroof panel assembly according to claim 1, wherein said panel, between its front edge and said opening has a rib which protrudes upwards, and extends parallel to said front edge, said rib having latched surfaces.

4. A sliding interior sunroof panel assembly according to claim 1, wherein said location space between s aid rear wall element of each ventilation duct and said flange edge has an acute-angled cross-section, extending outwards, and wherein the corresponding edge area of said opening has a corresponding acute-angled cross-section, at least in the area of engagement within said location space.

5. A vehicle roof panel assembly, comprising:
   a roof panel that is made from a rigid material and has an opening through a portion of the panel, the opening having first and second edges and a length and a width that is smaller an the length, the length and width being defined between the opening edges; and
   a ventilation strip that is at least partially received in the opening and including a flange having a first edge and a second edge, said flange being received against each of the roof panel opening edges, the strip including a plurality of ventilation ducts each having a front and a rear surface, the front surface of each duct including a latching projection that extends outwardly from the front surface and engages a corresponding structure on the panel that is near the first opening edge, each latching projection being spaced rearwardly of the flange first edge, the rear surface of each duct extending over a portion of the flange second edge in a direction opposite from the latching projections such that the opening second edge is received between the strip flange second edge and the extending rear surface of the ducts.

6. The assembly of claim 5, wherein the ventilation ducts define a body length of the ventilation strip that is smaller than the opening length such that there is some play in a longitudinal direction relative to the opening between the ventilation strip and the panel opening.

7. The assembly of claim 6, wherein the ventilation ducts define a body width that positions the latching projections relative to the corresponding structure on the panel such that there is some lateral play relative to the opening between the ventilation strip and the panel opening such that the latching projections and the corresponding panel structure are adjustable relative to each other in a lateral direction when the strip is received in the panel opening.

8. The assembly of claim 5, wherein the strip includes a gripper portion positioned between two of the ducts.

9. The assembly of claim 5, wherein each duct front surface extends from adjacent the first flange edge in a direction toward the second flange edge and projects away from a plane containing the flange, each duct second surface extends from adjacent the second flange edge in a direction generally parallel to the direction that the first surface extends such that the second flange edge and the second duct surface form a receiving space that snugly receives a corresponding edge of the panel opening.

10. The assembly of claim 9, wherein the latching projections extend from the first duct surfaces in a direction that extends toward the first flange edge and is generally parallel to the plane containing the flange.

11. The assembly of claim 10, wherein a distance between the latching projections and the first flange edge is greater than a distance between the extending rear surface and the second flange edge.

12. The assembly of claim 9, wherein the ventilation duct first surfaces each have a generally arcuate shape.

13. The assembly of claim 5, wherein the latching projections, the ventilation ducts and the flange are all integrally formed as a single-piece strip from a polymer material.

14. The assembly of claim 13, wherein the strip is injection molded from a plastic material.

15. The assembly of claim 5, wherein the strip is mounted to said panel with longitudinal and lateral play.

16. The assembly of claim 1, wherein said strip is mounted to said panel with longitudinal and lateral play.

17. A sliding interior sunroof panel assembly for an automobile sunroof comprising:

a panel and a ventilation strip mounted to said panel;

said panel defined by first, second and side edges and formed of a rigid material;

said first edge having a forward region aligned generally parallel to an opening;

said ventilation strip latched into said opening and provided with a plurality of ventilation ducts spaced along an alignment parallel to said first edge; said ventilation ducts each having a front wall element, a rear wall element and opposed side elements such that each said duct extends from a ventilation opening in one side of said panel to a ventilation opening on an opposite side of said panel;

a flange edge formed around front, rear and side edges of said strip so as to abut against corresponding edge areas around said opening;

said duct rear wall element extending over at least a part of a corresponding edge of said opening as abutted on by a rear part of said flange edge, so as to hold said strip rear edge against said panel in a location space defined between said rear wall element and said flange edge;

each said duct comprising at least one latching projection extending from said front wall element when latched over at least a part of said corresponding edge areas of the opening as abutted on by a forward part of said flange edge, said latching projections engaging with a corresponding part of said panel;

wherein said panel, between its front edge and said opening has a rib which protrudes upwards, and extends parallel to said front edge, said rib having latched surfaces and wherein said strip is mounted to said panel with longitudinal and lateral play.

18. A sliding interior sunroof panel assembly for an automobile sunroof comprising:

a panel and a ventilation strip mounted to said panel;

said panel defined by first, second and side edges and formed of a rigid material;

said first edge having a forward region aligned generally parallel to an opening;

said ventilation strip latched into said opening and provided with a plurality of ventilation ducts spaced along an alignment parallel to said first edge; said ventilation ducts each having a front wall element, a rear wall element and opposed side elements such that each said duct extends from a ventilation opening in one side of said panel to a ventilation opening on an opposite side of said panel;

a flange edge formed around front, rear and side edges of said strip so as to abut against corresponding edge areas around said opening;

said duct rear wall element extending over at least a part of a corresponding edge of said opening as abutted on by a rear part of said flange edge, so as to hold said strip rear edge against said panel in a location space defined between said rear wall element and said flange edge;

each said duct comprising at least one latching projection extending from said front wall element when latched over at least a part of said corresponding edge areas of the opening as abutted on by a forward part of said flange edge, said latching projections engaging with a corresponding part of said panel;

wherein said location space between said rear wall element of each ventilation duct and said flange edge has an acute-angled cross-section, extending outwards, and wherein the corresponding edge area of said opening has a corresponding acute-angled cross-section, at least in the area of engagement within said location space and wherein said strip is mounted to said panel with longitudinal and lateral play.

* * * * *